3,380,018
DIGITAL DENSITY THRESHOLD FOR SONAR
Woodrow H. Littrell, Robert D. Isaak, William E. Klund, and Ronald K. Betsworth, San Diego, Calif., assignors to the United States of America as represented by the Secretary of the Navy
Filed Mar. 20, 1967, Ser. No. 624,618
4 Claims. (Cl. 340—3)

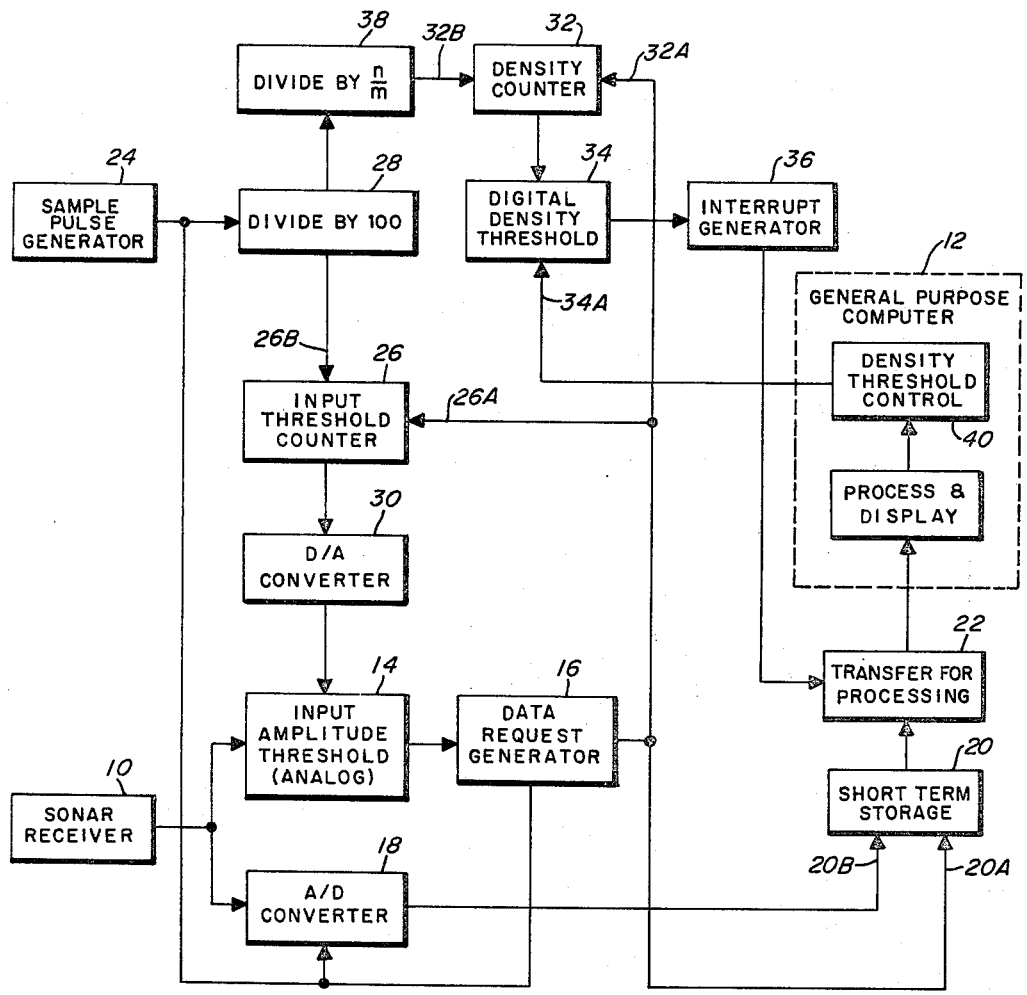

ABSTRACT OF THE DISCLOSURE

In active sonar, a target usually returns a "bunch" or cluster of echo signals. By comparing the spatial density of signals with a threshold number, the signal cluster can be recognized and distinguished from random noise.

---

The invention described herein may be manufactured and used by or for the Government of the United States of America for governmental purposes without the payment of any royalties thereon or therefore.

Background

The ocean, to a hydrophone, is quite noisy and the echo signals of active sonar can easily be lost. An amplitude threshold has been used in an effort to exclude noise from the computer and from the display screen. Unfortunately, weak target signals are also excluded. When the sonar range is great and the average strength drops below the average noise level, the usefulness of the sonar system is minimized. By lowering the amplitude threshold to admit the weak signals, then the abundance of noise soon overloads the computer, and obscures the display screen with "snow."

Summary

The object of this invention is to provide in sonar equipment an improved threshold system for separating wanted from unwanted signals. The object of this invention is attained by interposing a short term storage register between an amplitude threshold device and the computer employed for processing and displaying the signals. The amplitude of the threshold is normally low so that the weakest expected signal may pass to the short term storage. The contents of the storage is then transferred to the computer only when a cluster of signals (characteristic of a genuine target echo) are received. The rate at which the events of the cluster are received is usually much higher than the rate of the random events due to noise and is sensed by an integrator. The integrator comprises, preferably, an up-down counter; a clock source decreases the count at a fixed rate while received random and echo pulses increases the count. If a cluster causes the count to exceed a threshold value, a trigger pulse will transfer the contents of the short-term storage to the computer for processing. In this way, then, only clustered groups of pulses are admitted to the computer and are displayed. Other objects and features of this invention will become apparent by referring to the embodiment described in the following specification and shown in the accompanying drawing in which the single figure is a block diagram of the principal elements of the digital density threshold system of this invention.

In the drawing is shown the sonar receiver 10 and interface equipment between the sonar receiver and a general purpose computer 12. The transmitting portion of active sonar (not shown) is assumed to be capable of transmitting a powerful pulse into the ocean water to "illuminate" target objects both near and far. There may be considerable time spreading of the echo pulse due to target dimensions and/or multiple propagation paths and/or side lobe responses of the system. By cross- or auto-correlation in the receiver 10, the signal-to-noise ratio can be improved. To facilitate this disclosure multiple channels required for Doppler frequency detection will be omitted. The digital computer 12 is capable of storing large quantities of data and contains the usual arithmetic operating units for extracting useful signals from the data and presenting those signals to a display such as a cathode ray tube. It is well known that the capacity of any computer is finite and that it is easy to obtain an alarm signal when the storage capacity is exceeded.

Each sonar signal, or event, is applied to the input amplitude threshold device 14 and if the amplitude of the signal exceeds the threshold an output pulse is applied to the data request generator 16. Upon the simultaneous occurrence of a sample or clock pulse from local generator 24, a data request pulse is generated in generator 16 and is applied to several operating points, as will appear. One of those operating points is the input terminal 20A and the control circuit for the short term storage device 20. It will be observed that the sonar signal is also applied to the analog-to-digital converter 18, the output of which is applied to a second input terminal 20B of storage device 20. The analog-to-digital conversion of all signals is made in synchronism with the sample pulse of clock generator 24. The digital word at the output 18 is sufficiently detailed to completely define the sonar event applied to the converter. Coincidence of the data request pulse at terminal 20A admits the data word at the terminal 20B to the storage device.

Normally, the amplitude threshold in 14 is quite low so that many signals including noise is passed by the threshold device 14. This means that no wanted signals though weak will be lost. The corresponding data words are stored and will normally rapidly fill the storage device. When overflow occurs the oldest data words in the storage device are discarded. The contents of the storage 20 is transferred to the computer 12 only through the transfer switch mechanism 22. While the storage 20 has been shown external to the computer, such storage could and probably would be incorporated within the logic circuitry of the computer.

The amplitude of the threshold voltage applied to 14 is controlled upwardly and downwardly by the up-down input threshold counter 26. The counter which may be a conventional shift register, may be made to count upwardly with each pulse applied to terminal 26A and count downwardly with each pulse applied to terminal 26B. The down count is conveniently obtained from the sample pulse generator 24 and is preferably a small fraction of the sample pulse rate. For this purpose the divider 28 is provided, a divide-by-100 being suggested. In operation then the counter continues to degrade in counter-content until a request data pulse is received at 26A whereupon the count starts upwardly.

By converter 30 the numerical content of counter 26 is converted to an analog signal and is applied to the proper control electrode of the threshold device 14. It is apparent now that the amplitude threshold will seek a level at which the up-count equals the down-count and amplitude threshold becomes stable for a given receiver output condition.

Now, the movement of data from storage 20 into the computer for processing is controlled by the density counter 32 which also is an up-down counter. The counter content goes up in response to pulses at terminal 32A and goes down in response pulses at terminal 32B.

The contents of counter 32 is continually presented to the digital density threshold device 34, and if the numerical value thereof exceeds the numerical value presented digitally at terminal 34A then a pulse is transferred to the interrupt generator 36. Generator 36 produces a pulse which is applied to the transfer switching circuits of circuits 22 for transferring the contents of storage 20 into the processing circuits of the computer 12.

The numerical value of the contents of the density counter is reduced at a predetermined rate which is controlled by the sample pulse rate of 24, divided by the divider 28 which, in turn, is further divided by the $n/m$ divider 38. $n$ is the number of channels to be controlled and displayed by the equipment and is 1 in the case assumed here where a single channel only is treated. The value $m$ may be set greater, equal to or less than $n$. If $m$ is set equal to $n$ the count down rate is equal to the average data request rate from 16 and the average value contained in the density counter for random impulse signals varies little.

Echo-like signals produce high data rates for short time periods. The decay rate of the density count can be increased by reducing the value of $m$ and should be adjusted to be compatible with the expected number of data words associated with an echo. The contents of the density counter are supplied to the digital density threshold device 34 as stated. When the value in the density counter exceeds the digital density threshold level set by the computer the interrupt generator 36 provides a computer interrupt pulse which causes the switch 22 to transfer the data contained in the short term storage to the computer for processing. The digital density threshold level may be controlled by the computer to adjust the number of transfer switching operations so that the computer processing capability is efficiently utilized without overloading. The logic circuit 40 for generating the density threshold level in the computer is not shown in detail. The density threshold would logically be selected at the highest level that could be tolerated without overloading the computer.

Obviously many modifications and variations of the present invention are possible in the light of the above teachings. It is therefore to be understood that within the scope of the appended claims the invention may be practiced otherwise than as specifically described.

What is claimed is:

1. A signal density threshold system for interconnecting a computer with a sonar receiver, said system comprising;
   a short term digital storage device (20),
   a transfer switch (22) for emptying the contents of said storage device into said computer,
   a sample pulse generator (24),
   an input amplitude threshold device (14) coupled between said receiver and storage device,
   a data request generator (16) for generating a pulse in response to each signal passed by said input amplitude threshold device,
   a density counter (32) with an up-count circuit connected and responsive to the output of said data request generator and a down-count circuit connected and responsive to said sample pulse generator,
   a digital density threshold device (34) connected to receive the contents of said density counter, said device including means for comparing the counter contents with a computer-derived density threshold number, and
   means (36) responsive to said digital density threshold device for operating said transfer switch to transfer the contents of said storage device into said computer, so that said computer accepts data from said storage at a rate near the maximum processing rate of said computer.

2. The system defined in claim 1 further comprising;
   an input up-down threshold counter (26) having a down-count terminal coupled to said sample pulse generator and an up-count terminal coupled to the output of said data request generator, and
   means (30) for converting the numerical content of said up-down counter to a threshold amplitude for said amplitude threshold device.

3. The system defined in claim 2 further comprising;
   a divider (28) connected in the coupling circuit between said down-count terminal and said sample pulse generator for relatively slowly reducing the contents of said density counter in the absence of signals.

4. The system defined in claim 2 further comprising;
   a connection from the outputs of said sample pulse generator to a control circuit of said data request generator for synchronizing data request pulses with the up and down counts of both of said counters.

References Cited

UNITED STATES PATENTS 3,214,754  10/1965  Hildebrandt _____ 343—5

RICHARD A. FARLEY, *Primary Examiner.*